United States Patent
Shimizu et al.

(10) Patent No.: US 7,109,718 B2
(45) Date of Patent: Sep. 19, 2006

(54) UNDERGROUND EXPLORATION APPARATUS

(75) Inventors: Shigekazu Shimizu, Saitama-ken (JP); Yasuo Takahashi, Tokyo (JP); Yukio Kishimoto, Kobe (JP); Tomoaki Ueda, Kyoto (JP); Kazuhito Nakamura, Ashiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/257,031

(22) Filed: Oct. 25, 2005

(65) Prior Publication Data
US 2006/0091890 A1 May 4, 2006

(30) Foreign Application Priority Data
Nov. 1, 2004 (JP) ............................. 2004-317845

(51) Int. Cl.
*G01V 3/06* (2006.01)

(52) U.S. Cl. ...................................... 324/347; 324/357
(58) Field of Classification Search ................ 324/347, 324/357, 358, 326–329; 702/12, 13
See application file for complete search history.

(56) References Cited

U.S. PATENT DOCUMENTS 1,808,397 A * 6/1931 Billotte et al. ............... 324/354
2005/0093548 A1 * 5/2005 Ueda et al. .................. 324/357

* cited by examiner

*Primary Examiner*—Reena Aurora
(74) *Attorney, Agent, or Firm*—Fitzpatrick, Cella Harper & Scinto (57) ABSTRACT

A current to be applied to a ground is defined as the sum of two sinusoidal waves having first and second frequency components. A signal to be used at the time of synchronous detection is defined as a difference between the sinusoidal waves having the first and second frequency components. As a result, a substance in the ground, and the position and depth of the substance can be specified with high accuracy.

3 Claims, 14 Drawing Sheets

| MATERIAL | ABBREVIATION | DIELECTRIC CONSTANT | |
|---|---|---|---|
| AIR, GAS | | 1.0001 | |
| WATER (PURE WATER) | | 55~85 (88) | 0°C |
| ALUMINA, SILICONE RUBBER, SODA GLASS | | 8~10 | |
| CRUDE OIL | | 1.8~2.5 | |
| SAND (DRY ⇒ CONTAINING MOISTURE) | | 3~5 ⇒ 20~30 | |
| SOIL | | 5~40 | |
| TITANIUM OXIDE | | ABOUT 100 | |
| BARIUM TITANATE | | SEVERAL THOUSANDS OR MORE | |
| 1,1,1-TRICHLOROETHANE | | 7.1 | 0°C |
| FREON113 | | 2.4 | 25°C |
| FLUORINE-BASED AK-225 | | 4.1 | 25°C |
| METHYLENE CHLORIDE | | 9.1 | 20°C |
| ASAHI TRICHLOR | | 3.4 | 20°C |
| ASAHI PERCHLOR | | 2.4 | 15°C |
| POLYETHER-ETHER-KETONE | PEEK | 3.3 | at 1MHz |
| POLYETHER-IMIDE | PEI | 3.15 | at 1MHz |
| POLYETHYLENE-TEREPHTHALATE | PET | 3.2 | at 1MHz |
| POLYSULFONE | PSF | 3.06 | at 1kHz |
| POLYOXY-BENZOYL | POB | 3.68 | at 1kHz |
| POLYETHER-SULFONE | PES | 3.5 | at 1kHz |
| DAIFLON | 3F | 2.3~2.7 | at 1kHz |
| VINYLIDENE DIFLUORIDE | 2F | - | at 1kHz |
| ABS | ABS | 3.03 | at 1kHz |
| POLYPROPYLENE | PP | 2.0~2.3 | at 1kHz |
| POLYETHYLENE | PE | 2.3 | at 1kHz |
| ULTRAHIGH MOLECULAR WEIGHT POLYETHYLENE | UPE | - | at 1kHz |
| POLYCARBONATE | PC | 2.94 | at 1kHz |
| NORYL | PPO | 2.69 | at 60Hz |
| POLYBUTYLENE-TEREPHTHALATE | PBT | 3.3 | at 1kHz |
| POLYPHENYLENE-SULFIDE(G-40%) | PPS | 4 | at 1kHz |
| POLYAMIDE IMIDE | PAI | 3.5 | at 1kHz |
| POLYIMIDE | PI | 3.65 | at 60Hz |
| POLYOXYMETHYLENE[POLYACETAL] | POM | 3.7 | at 1kHz |
| MONOMER CAST NYLON | MC | 3.7 | at 1MHz |
| NYLON6[ABSOLUTE DRY] | 6N | 3.9 | at 1kHz |
| NYLON66[ABSOLUTE DRY] | 66N | 4 | at 1kHz |
| TEFLON | 4F | 2.1 | at 1kHz |

■ NO ELECTRIC FIELD E=0

⊘ NEGATIVE CHARGE

■ ELECTRIC FIELD APPLIED E≠0

○ POSITIVE CHARGE

FIG. 4B

■ NO ELECTRIC FIELD E=0

■ ELECTRIC FIELD APPLIED E≠0

FIG. 5A

CURRENT APPLICATION ELECTRODE

ELECTRIC CONDUCTIVITY $\sigma_2$, DIELECTRIC CONSTANT $\varepsilon_2$

ELECTRIC CONDUCTIVITY $\sigma_1$, DIELECTRIC CONSTANT $\varepsilon_1$

FREQUENCY $f_1$

FIG. 5D

FREQUENCY $f_2$

FIG. 6A

FREQUENCY $f_1$

FIG. 6B

FREQUENCY $f_2$

FIG. 6C

FREQUENCY $f_1-f_2$

⟷ MAIN CURRENT COMPONENT

FIG. 6D

FREQUENCY $f_1-f_2$

⟶ $\left( \dfrac{\delta E}{\delta y} \quad \dfrac{-\delta E}{\delta x} \right)$

UNDERGROUND EXPLORATION APPARATUS

BACKGROUND OF THE INVENTION

1. Field of the Invention

The present invention relates to an underground exploration apparatus using an alternating current test method. More specifically, the present invention relates to an underground exploration apparatus for selectively probing a specific substance embedded in the ground or incorporated into the ground by: applying, between two different positions on the ground as a probing region, two alternating currents having different frequencies selected on the basis of the frequency characteristics of the dielectric constant of a substance to be probed; and measuring a potential difference between alternating voltages resulting from the currents applied to the ground at other two positions.

2. Related Background Art

A method of probing the ground involving the use of an alternating current test method in which an alternating current is caused to pass through the ground as a probing region has been conventionally known as a method of probing the ground. The method of probing the ground involving the use of an alternating current test method is disclosed in each of Japanese Patent Application Laid-Open No. H07-012766, Japanese Patent Application Laid-Open No. H09-127253, Japanese Patent Application Laid-Open No. H10-293181, Japanese Patent Application Laid-Open No. 2000-028743, Japanese Patent Application Laid-Open No. 2001-074850, and Japanese Patent Application Laid-Open No. 2002-156460.

The dielectric constant of soil-constituents or of a chemical substance in a soil depends on a frequency owing to physical properties such as interfacial polarization and dipolar polarization. Accordingly, in recent years, a method in which attention is paid to the frequency characteristics of the dielectric constant of a substance to be probed has been examined as an alternating current test method.

Hereinafter, the method in which attention is paid to the frequency characteristics of the dielectric constant of a substance to be probed will be described.

Figure 2:
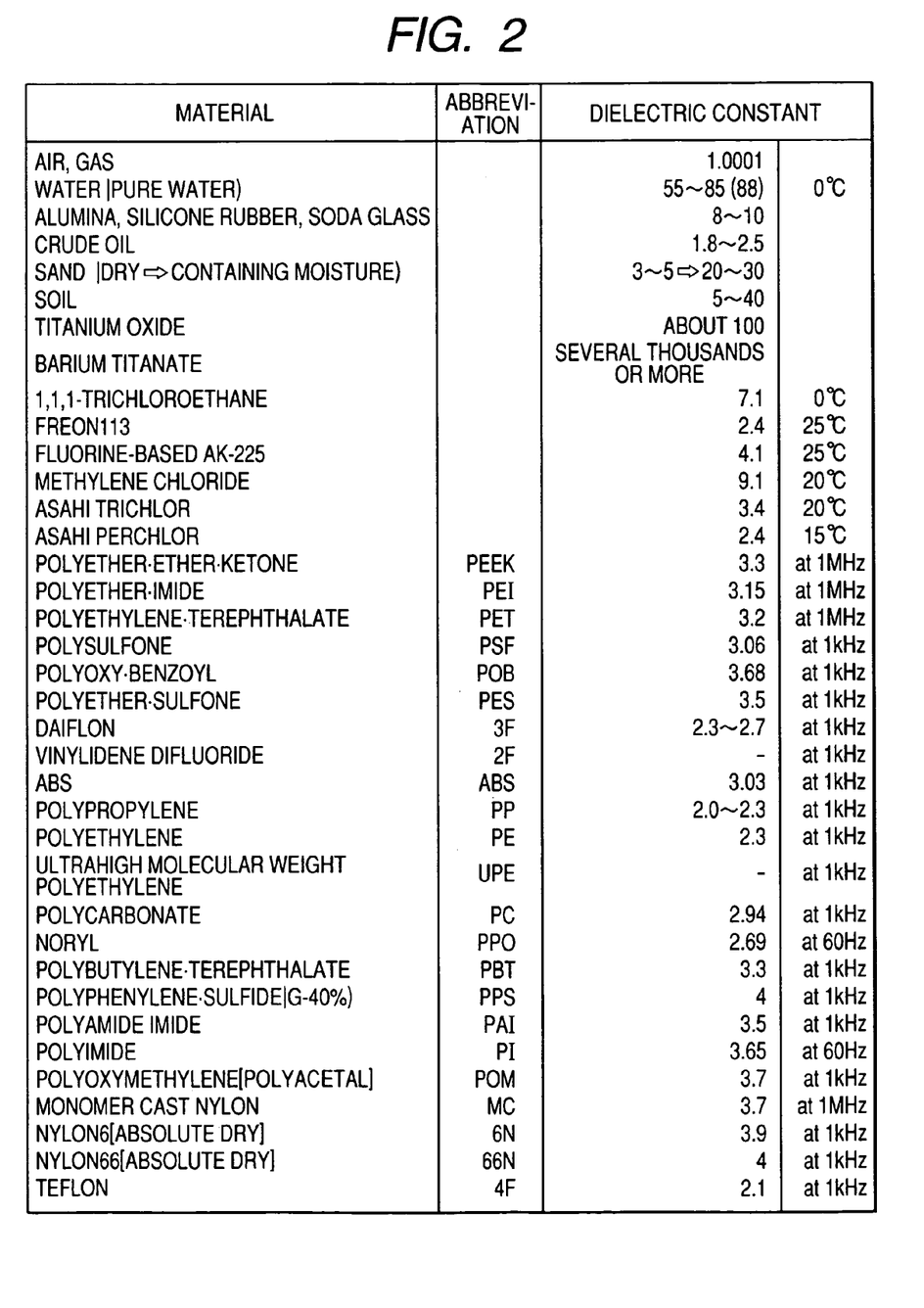
FIG. 2 is a chart for explaining the fact that soil substances and various chemical substances have different relative dielectric constants.

As shown in FIG. 2, soil-constituents and chemical substances in a soil have various dielectric constants. However, a trace amount of barium titanate having a dielectric constant of 1,000 in a soil having a dielectric constant of about 5 to 40 does not largely change the impedance of the soil, so the impedance is kept nearly constant. That is, a conventional electric probing method does not allow a trace amount of an embedded substance to be probed.

Figure 3:
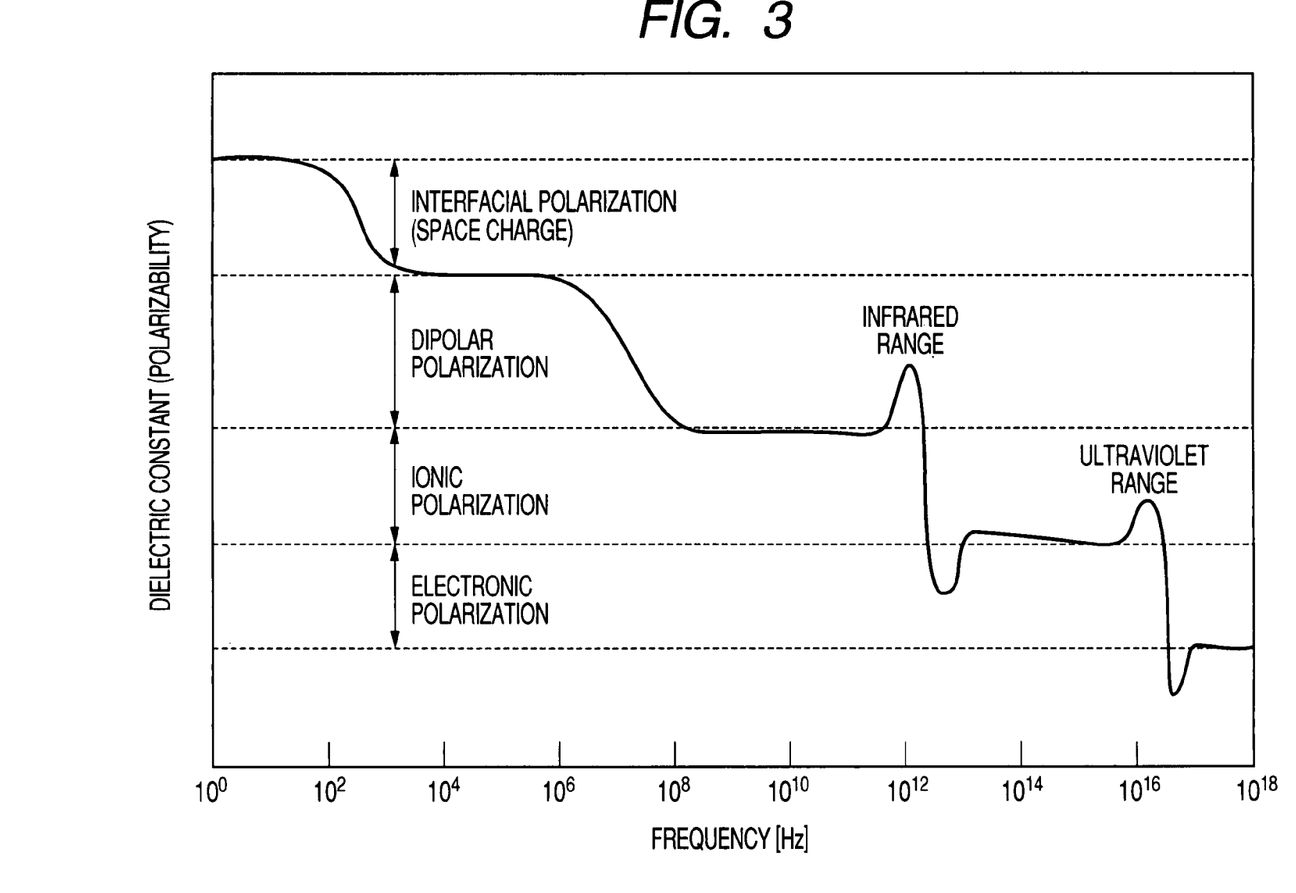
FIG. 3 is a view for explaining the frequency dependence of a dielectric constant and a factor for the dependence.

However, the dielectric constant is a physical parameter resulting from a polarization phenomenon occurring in a substance. Examples of the polarization phenomenon include factors such as interfacial polarization, dipolar polarization, ionic polarization, and electronic polarization. As shown in FIG. 3, the dielectric constant has frequency characteristics with which the dielectric constant largely changes at a frequency corresponding to each polarization factor. Of those polarization factors, the interfacial polarization and the dipolar polarization are each a phenomenon occurring in a low frequency region.

Figure 4A:
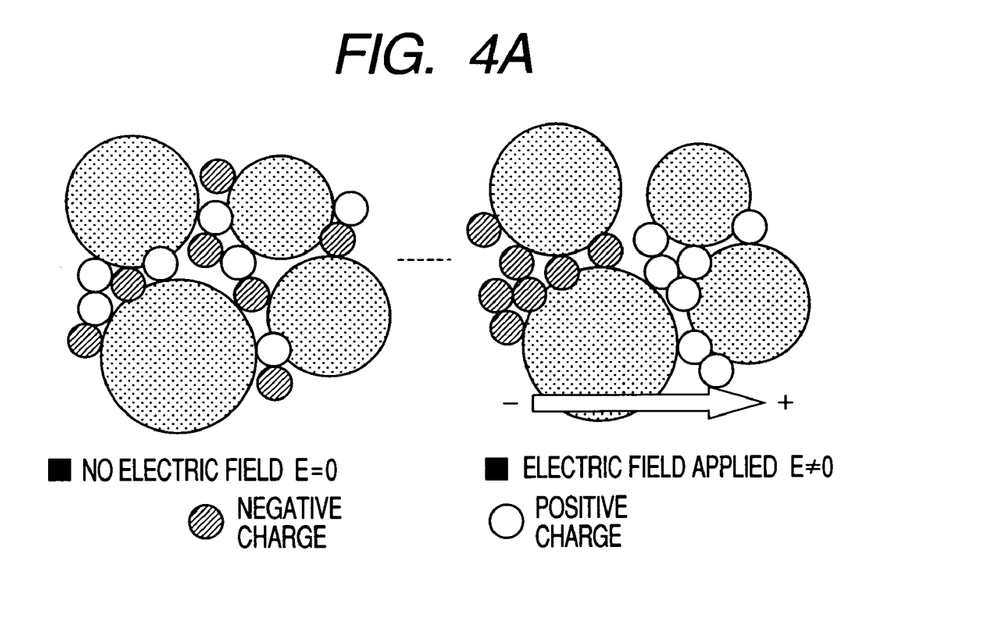
FIGS. 4A and 4B are views for explaining interfacial polarization and orientational polarization.

As shown in FIG. 4A, the interfacial polarization is a phenomenon caused by the movement of charged particles due to an electric field applied to a soil. Therefore, a polarization speed is largely affected by, for example, the mass and charge amount of the charged particles, the quality of the soil, and the viscosity of a medium. That is, the heavier the charged particles, the lower a polarization follow-up critical frequency. In contrast, the lighter the charged particles, the higher the polarization follow-up critical frequency. In addition, the polarization speed is less susceptible to a Coulomb force as the charge amount of the charged particles reduces, so the polarization follow-up critical frequency reduces. In contrast, the polarization speed is more susceptible to a Coulomb force as the charge amount of the charged particles increases, so the polarization follow-up critical frequency increases. When the soil is a porous substance or is composed of fine particles, the polarization follow-up critical frequency reduces because interfacial fluidity is extremely low. In contrast, when the soil is composed of large particles or fluidity is high at a particle interface, the polarization follow-up critical frequency increases. As described above, the polarization follow-up critical frequency corresponding to the interfacial polarization includes information on the soil and the charged particles.

Figure 4B:
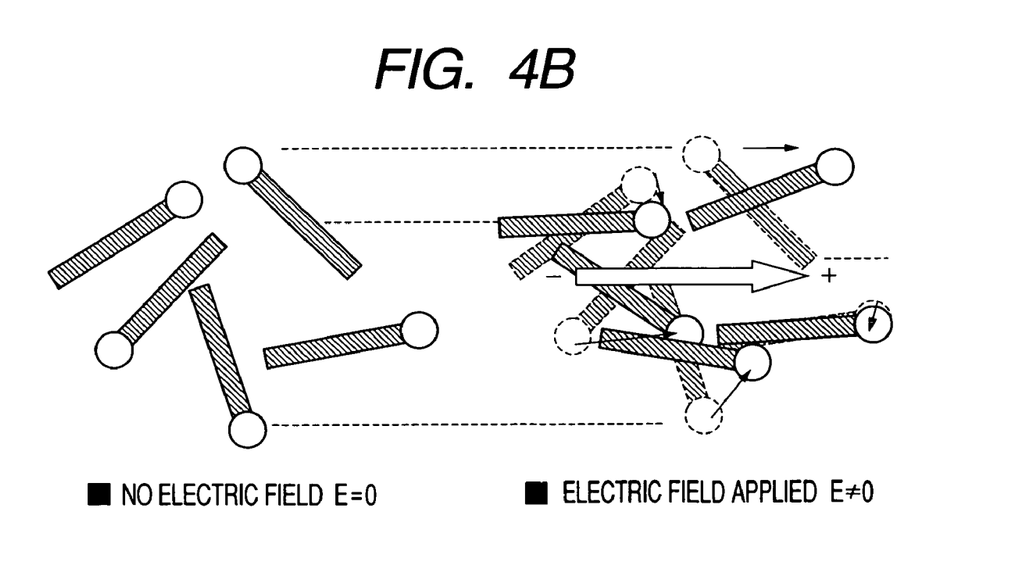

As shown in FIG. 4B, the dipolar polarization is a phenomenon in which a molecule itself constituting a substance is polarized by reason of its molecular structure and the molecule is rotated by an external electric field to change its direction, that is, its orientation to cause the substance to polarize. Therefore, a polarization speed is largely affected by, for example, the size, moment, and shape of the molecule. That is, the larger the molecule, the lower a polarization follow-up critical frequency. The smaller the molecule, the higher the polarization follow-up critical frequency. In other words, the polarization follow-up critical frequency reduces when the molecular orientation is hardly uniformed by an external electric field. The polarization follow-up critical frequency increases when the molecular orientation is easily uniformed by the external electric field. As described above, the polarization follow-up critical frequency corresponding to the dipolar polarization includes information on a molecule of a substance in the soil.

The polarization follow-up critical frequency corresponding to each of the interfacial polarization and the dipolar polarization described above is a physical parameter to be determined depending on the quality of a soil and the physical properties of the substance and molecules in the soil. In particular, the polarization follow-up critical frequency corresponding to the dipolar polarization is a physical parameter inherent in a substance in the soil. Accordingly, selecting two frequencies sandwiching the polarization follow-up critical frequency corresponding to the interfacial polarization or the dipolar polarization allows one to selectively probe a substance to be probed.

Figure 5A:
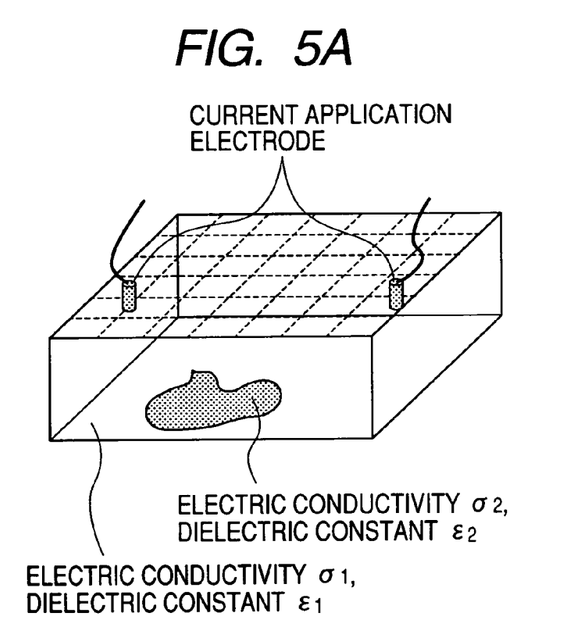
FIGS. 5A, 5B, 5C, and 5D are each a view for explaining the fact that the flow path and density of a current change owing to a partial difference in geology at a deep part of a ground resulting from a change in dielectric constant due to the frequency of an applied current.
Figure 5B:
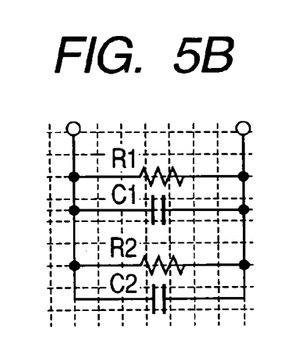
Figure 5C:
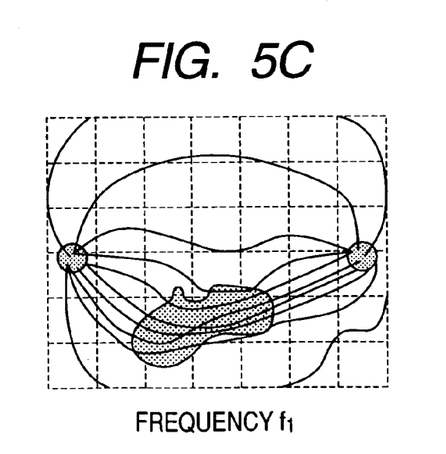
Figure 5D:
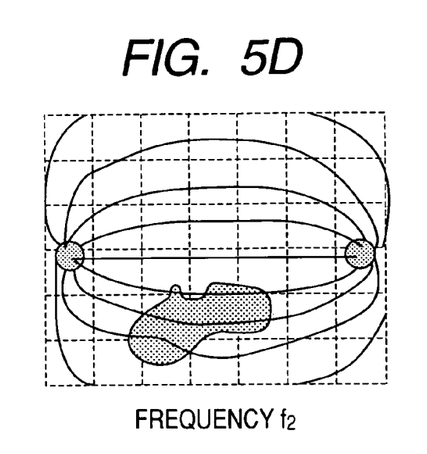

As shown in FIG. 5A, when an alternating current is applied between two different positions on the ground as a probing region, two cases, that is, the case where a first frequency f1 is caused to pass through and the case where a second frequency f2 is caused to pass through are compared; provided that a polarization follow-up critical frequency inherent in a substance to be probed is sandwiched between the frequencies f1 and f2. The frequencies f1 and f2 may be different from each other only in a dielectric constant $\epsilon_2$ in a shaded region containing the substance to be probed. The equivalent circuit of FIG. 5A can be replaced with that shown in FIG. 5B. The dielectric constant $\epsilon_2$ in the shaded region is high at the frequency f1, so an alternating current easily flows. The dielectric constant $\epsilon_2$ reduces at the frequency f2, so an alternating current hardly flows. As a result, as shown in FIGS. 5C and 5D, the density of a current flowing in the shaded region is high at the frequency f1 and is low at the frequency f2.

Figure 6A:
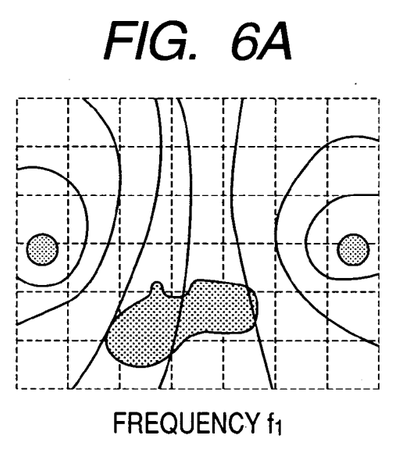
FIGS. 6A, 6B, 6C, and 6D are each a view for explaining the fact that the potential distribution of the surface of a ground-changes owing to a change in dielectric constant due to the frequency of an applied current to enable a substance in the ground to be selectively probed.
Figure 6B:
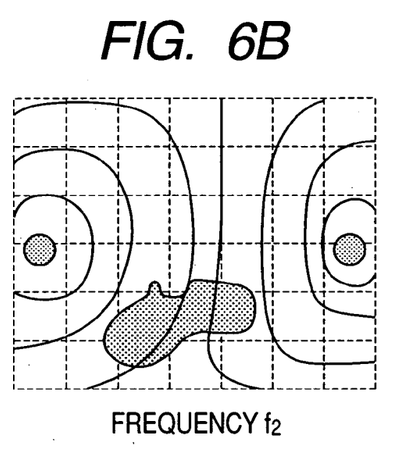
Figure 6C:
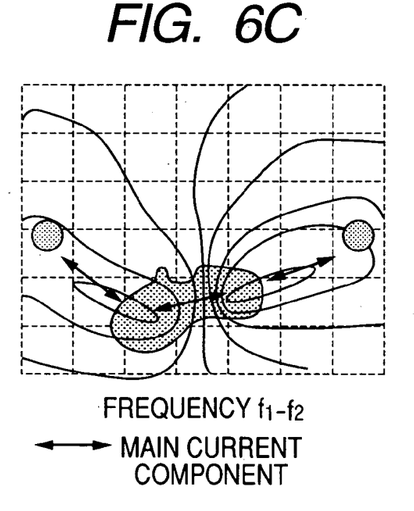

FIG. 6A shows isoelectric lines at the frequency f1, while FIG. 6B shows isoelectric lines at the frequency f2. At the frequency f1, a current easily flows in the shaded region, so a potential difference is hardly generated between the ends of the shaded region. In contrast, at the frequency f2, a current hardly flows in the shaded region as compared to the case of the frequency f1, so a large potential difference is generated between the ends of the shaded region. FIG. 6C is a view obtained by: measuring ground surface potential distributions at the frequency f1 and the frequency f2; and determining a difference between the distributions. The potential difference map is equivalent to a ground surface potential distribution resulting from a fluctuation in current density caused by a difference in applied frequency. Therefore, when the shaded region containing the substance to be probed is localized to the probing region, the same ground surface potential distribution as that generated when a dipolar current source is present in the shaded region is obtained. In other words, the ground surface potential distribution in this case is a dipole pattern having a pair of a peak and a valley.

Figure 6D:
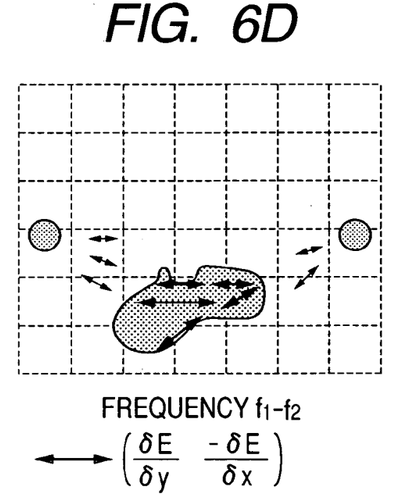

FIG. 6D is an electric field vector map obtained by treating the potential difference map for the surface of the ground shown in FIG. 6C obtained as described above. When graph drawing and a gray treatment are performed on the basis of the absolute value of an electric field vector, a portion directly above the shaded region having a large current density changed by a difference in applied frequency shows the largest absolute value and a high concentration.

Figure 7:
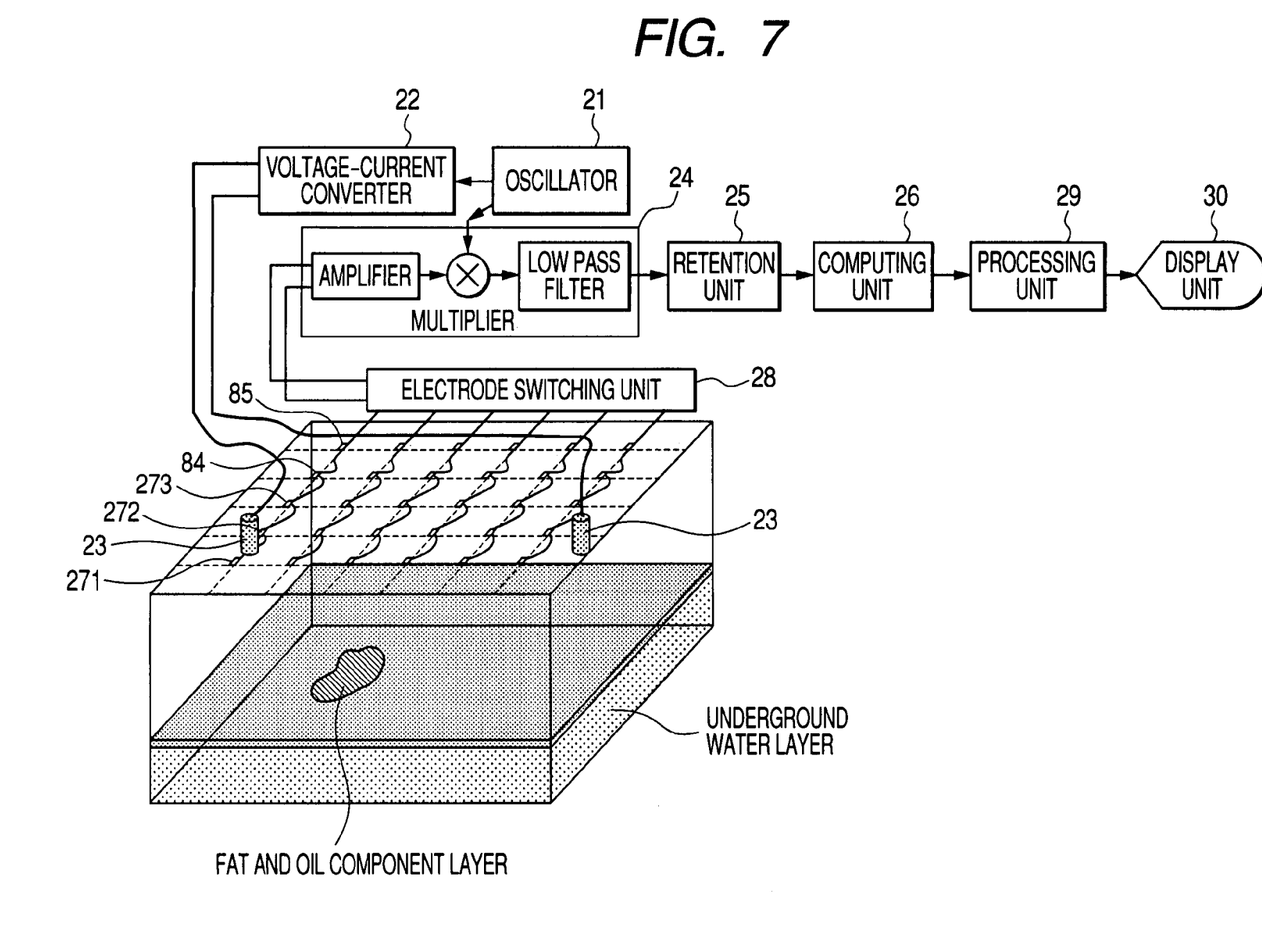
FIG. 7 is a view for explaining the form of the invention in a preceding application as a prior art.

As described above, a preceding application describes an apparatus which: performs electric probing by means of two frequencies sandwiching a polarization follow-up critical frequency inherent in a substance to be probed; measures ground surface potential distributions; and determines a difference between the distributions to allow selective ground probing of the substance. FIG. 7 shows the structure of an underground exploration apparatus in a preceding application. The ground probing system includes an oscillator, a voltage-current converter, an amplifier, a multiplier, and a low pass filter, and is structured such that it can perform probing at a single frequency at the same time. A retention unit holds measurements at respective frequencies, and a computing unit calculates a difference between surface potential distributions.

When the concentration of a substance to be probed in a soil is low or the total mass of the substance is small, a difference between a ground surface potential distribution by a first frequency and a ground surface potential distribution by a second frequency (the first and second frequencies sandwich a polarization follow-up critical frequency) is extremely small as compared to the absolute value of a ground surface potential. As a result, a change width may be several bits or less with respect to a conversion accuracy of 24 bits even when a high accuracy sigma delta-type AD converter is used for conversion. Cancellation resulting from a quantization error involved in the AD conversion makes it impossible to perform ground probing with high accuracy when the concentration of a substance to be probed is low or the volume of the substance is small.

SUMMARY OF THE INVENTION

According to one aspect of the present invention, an underground exploration apparatus includes: a first oscillating means for generating an alternating voltage signal of a first frequency out of two different frequencies selected on the basis of the frequency characteristics of the dielectric constant of a substance to be probed; a second oscillating means for generating an alternating voltage signal of a second frequency out of the two frequencies; adding means for calculating the added value of output signals supplied from the first oscillating means and the second oscillating means; amplifying means for amplifying an added alternating current signal supplied from the adding means to supply signals to two current application electrodes each intended for applying a current between two different points on a ground; differential amplifying means for measuring a potential difference between voltage signals generated on the ground by a current supplied by the amplifying means to the ground by means of signals supplied from voltage measurement electrodes placed at two different positions; subtracting means for calculating a subtracted value between the output signals supplied from the first oscillating means and the second oscillating means; multiplying means for performing synchronous detection by means of signals supplied from the differential amplifying means and the subtracting means; and low pass filtering means for removing a high-frequency component from a signal supplied from the multiplying means. Even when the change width of a potential difference between voltage signals appearing between two points on the ground when alternating currents having two selected frequencies are each independently applied to the ground is so small that it is lost in a quantization error involved in AD conversion, only the change width of the potential difference can be directly obtained as an output of a synchronous detector composed of a pair of the multiplying means and the low pass filtering means subsequent to the multiplying means. As a result, the change width of the potential difference can be directly subjected to AD conversion to be measured without being lost in the quantization error.

According to a further aspect of the invention, in addition to the above constitution, the grounding probing system further includes instantaneous current measuring means for measuring the current supplied by the amplifying means to the ground. As a result, an instantaneous current value actually applied to the ground can be measured simultaneously with the change width of a potential difference between voltage signals appearing between two points on the ground when alternating currents having two selected frequencies are each independently applied to the ground.

According to a further aspect of the invention, in addition to the above constitution, the ground probing system further includes: synchronous detecting means for performing synchronous detection by means of output signals supplied from the instantaneous current measuring means and the subtracting means to sample a difference between the current amplitude of a first frequency component and the current amplitude of a second frequency component; and constant current controlling means for supplying a control signal for causing at least one of the first oscillating means and the second oscillating means to adjust the amplitude of an output voltage by means of a signal supplied from the synchronous detecting means in such a manner that the difference between the current amplitude of the first frequency component and the current amplitude of the second frequency component is cancelled. As a result, control for causing the current amplitude of the first frequency component and the current amplitude of the second frequency component actually applied to the ground to coincide with each other can be performed, so control for driving each frequency component at a constant current can be performed and accurate measurement can be performed.

The above constitution has a specific effect that enables a small-scale circuit configuration to probe the presence of a region containing a substance to be probed present at an extremely low concentration in a probing region. That is, the ground probing system of the present invention can perform accurate measurement even when a potential difference is lost in a quantization error involved in AD conversion so it cannot be measured with sufficient measurement accuracy or cannot be measured at all by means of an underground exploration apparatus of a preceding application.

The above constitution enables an instantaneous current value actually applied to the ground to be measured simultaneously with the change width of a potential difference between voltage signals. As a result, the above constitution has a specific effect in that data processing after measurement by driving at a constant voltage enables the change width of a potential difference between voltage signals appearing between two points on the ground to be converted into a value when the voltage signals are applied at the same current amplitude. That is, the above constitution eliminates the need for two independent circuits to be driven at a constant current when alternating currents having two selected frequencies are each driven at a constant current, in spite of the fact that the two circuits are needed for the driving.

Furthermore, the above constitution has a specific effect that enables constant current control for causing the current amplitude of the first frequency component and the current amplitude of the second frequency component actually applied to the ground to coincide with each other to be performed. That is, the amplifying means for applying a high-frequency current to the ground may be a circuit to be driven at a constant voltage that does not perform feed back control for driving at a constant current. As a result, even a current having an extremely high frequency can be supplied, and driving at a constant current can be substantially performed.

Other features and advantages of the present invention will be apparent from the following description taken in conjunction with the accompanying drawings.

DESCRIPTION OF THE PREFERRED EMBODIMENTS

A first oscillating means and a second oscillating means are each preferably constituted by a phase locked loop (PLL) or a direct digital synthesizer (DDS). In this case, a sinusoidal wave can be oscillated at an accurate frequency by external setting.

One of the first oscillating means and the second oscillating means is preferably constituted so as to receive a clock supplied from the other. In this case, the two oscillating means can be operated in synchronization with each other, so measurement can be performed with an accurate time base.

The amplitude of an output voltage of amplifying means is preferably determined in proportion to a distance between the current application electrodes placed on the ground as a probing region. In this case, measurement accuracy that is hardly affected by the size of the ground as a probing region and remains nearly unchanged at all times can be obtained.

The amplitude of the output voltage of the amplifying means is more preferably set to be higher than usual when the trolley leakage current noise of a commercial power source greatly affects the ground as a probing region. In this case, an S/N ratio involved in measurement can be increased.

The cut-off frequency of low pass filtering means is preferably set to be sufficiently low as compared to each of the selected first and second frequencies. In this case, the leakage of a carrier frequency involved in synchronous detection can be suppressed and the S/N ratio can be increased.

Instantaneous current measuring means is preferably a shunt resistor for measuring a current having a resistance sufficiently small as compared to an impedance between the current application electrodes. In this case, an instantaneous current can be measured with sufficient frequency response characteristics.

Hereinafter, the embodiments of the present invention will be described in detail with reference to the drawings. The same reference numerals are given to the identical or corresponding portions in the drawings, and description thereof is not repeated.

First Embodiment

Figure 1:
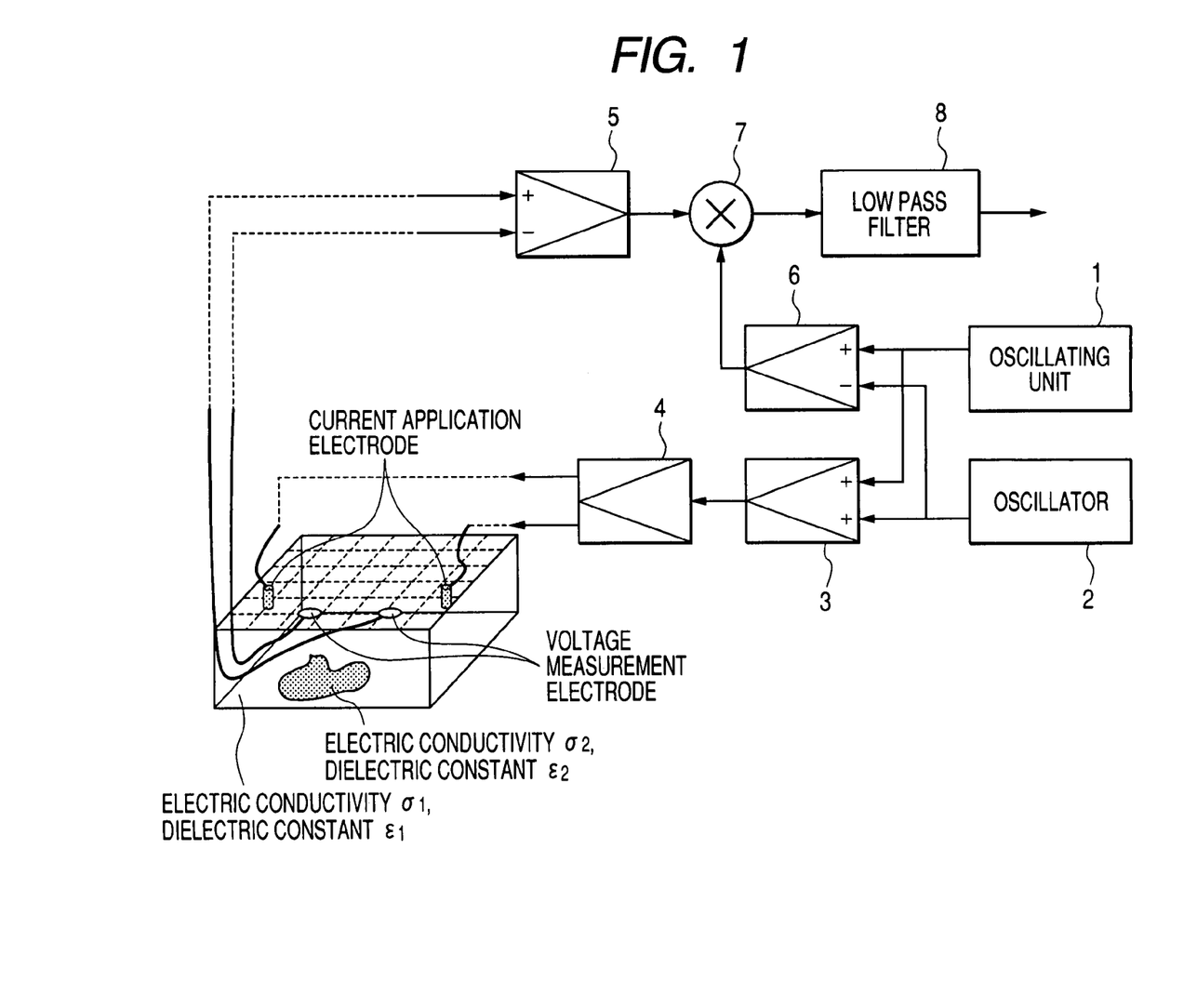
FIG. 1 is a view for explaining the structure of an underground exploration apparatus according to an embodiment of the present invention.

FIG. 1 is a view for explaining a structure according to an embodiment of the present invention.

Figure 8:
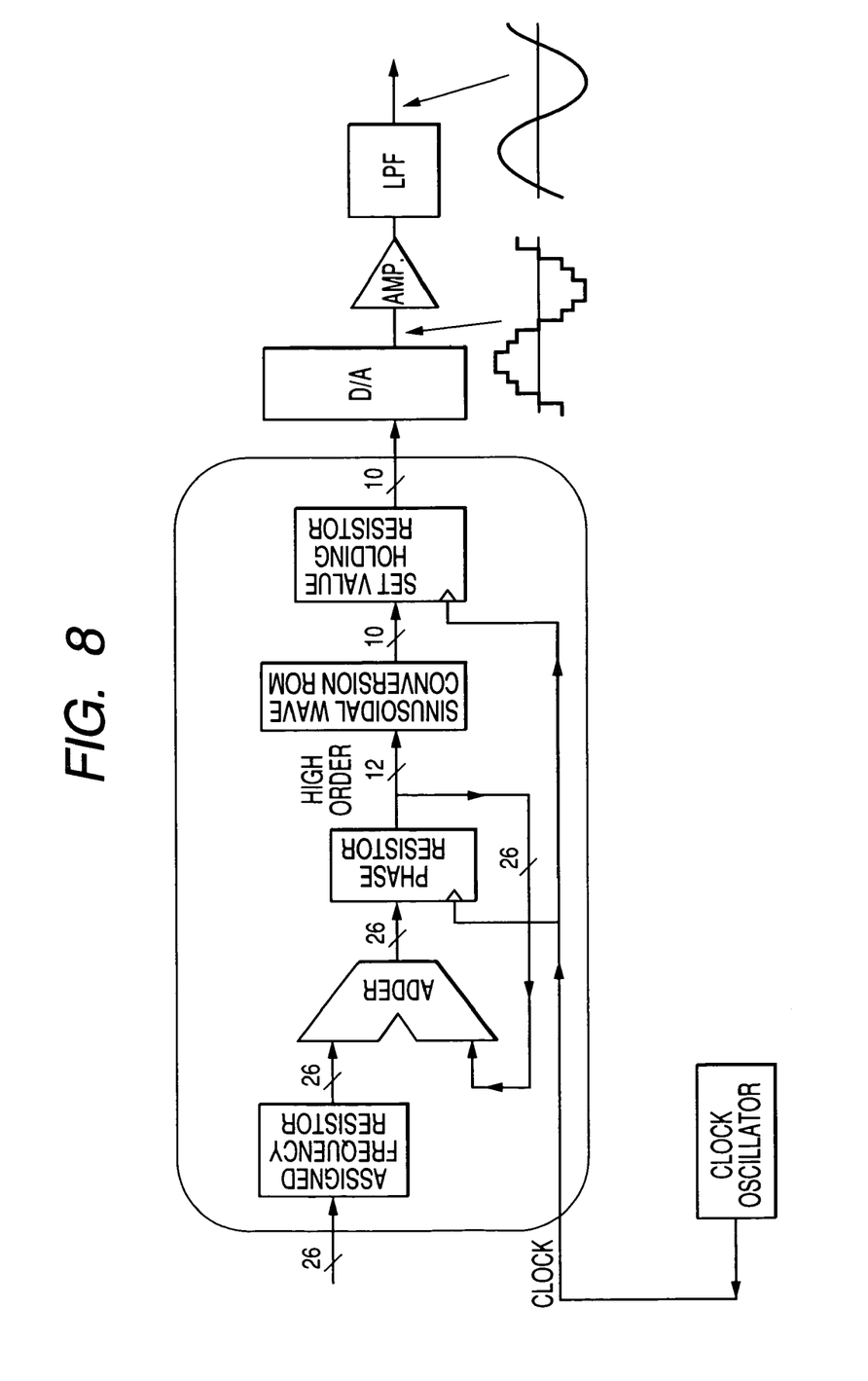
FIG. 8 is a view for explaining the internal structure of a direct digital synthesizer.

In FIG. 1, the oscillating means 1 is a first direct digital synthesizer for generating a sinusoidal wave as an alternating voltage signal of a first frequency out of two different frequencies selected on the basis of the frequency characteristics of the dielectric constant of a substance to be probed. In addition, the oscillating means 2 is a second direct synthesizer (DDS) for generating a sinusoidal wave as an alternating voltage signal of a second frequency out of the two frequencies. The frequencies at which those first and second direct digital synthesizers oscillate are set in Hz units by a communication command from an external computer (not shown). To be specific, those two direct digital synthesizers are each constituted by a DDS device manufactured by Wellpine, a high-speed DA converter, an amplifier, a low pass filter, and a clock oscillator, and the schematic constitution of each of the synthesizers is as shown in FIG. 8. The term "direct digital synthesizer" refers to a digital calculator for generating a sinusoidal wave having a designated oscillatory frequency (Hz) through direct logical operation. The values for: the bit width of a resistor or of an adder; the address of an ROM; a data bit width; and the data width of a set value holding resistor exemplified in FIG. 8 are for explanation, and are not particular constraints in principle. The inside of the DDS device manufactured by Wellpine has an adding circuit for $2^N$ digits for performing cumulative addition for each input clock. When a system clock is 67.10886 MHz ($2^{26}$ Hz), the arithmetic bit width of the adder is 26 bits. As a result, when 1 is set in a designated resistor, overflow (carry) occurs every 67,108,860 clocks, so a counter having a 1-Hz period is obtained. At this time, the higher twelve bits of a phase resistor change from 000000000000B to 111111111111B within the 1-Hz period. Therefore, the waveform of a sinusoidal wave for one period with its address serving as a phase (0 to $2\pi$) is recorded in a sinusoidal wave conversion ROM, whereby a clear sinusoidal waveform can be outputted every 1 Hz. When a value X times as large as an arbitrary value is set in an assigned frequency resistor, the period in which overflow occurs decreases by a factor of X, so a sinusoidal wave of X Hz is outputted. As described above, a direct digital synthesizer is characterized in that it can directly assign a frequency for a sinusoidal wave to be outputted by means of a digital value.

Figure 9A:
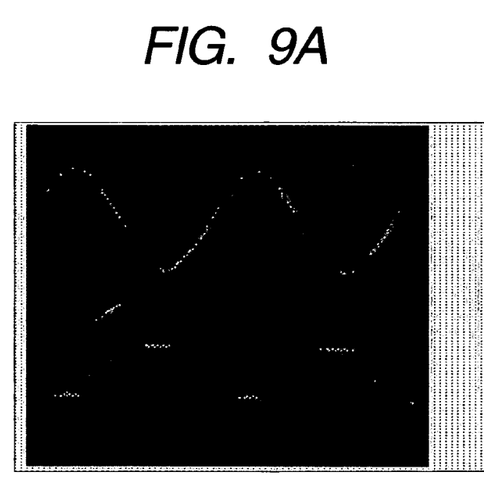
FIGS. 9A and 9B are each a view for explaining the signal shape of an applied current.
Figure 9B:
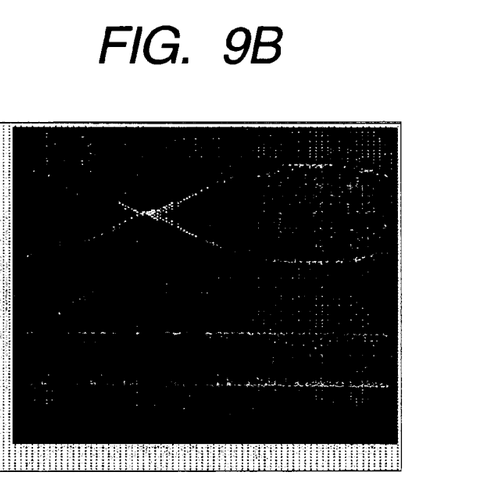

Adding means 3 for calculating the added value of output signals supplied from the oscillating means 1 and the oscillating means 2 is a broadband differential amplifier of a gain 1 constituted by a high-speed OP amplifier. The waveforms exemplified in FIG. 9A are examples of waveforms outputted from the oscillating means 1 and the oscillating means 2, and sinusoidal waves having different frequencies are outputted. Therefore, a signal to be outputted from the adding means 3 is of a waveform having a beat between two frequency components as in the case of the signal exemplified in an upper stage of FIG. 9B. When the output voltages of the oscillating means 1 and the oscillating means 2 are each 1 Vpp, the output voltage of the adding means 3 is 2 Vpp.

The amplifying means 4 is a broadband voltage amplifier constituted by a high-speed OP amplifier for amplifying an added alternating current signal supplied from the adding means 3 to supply signals to two current application electrodes each intended for applying a current between two different points on a ground. The impedance between the two current application electrodes changes from measurement condition to measurement condition depending on the distance between the current application electrodes and the water content of the ground. In view of the above, an amplification factor is determined in such a manner that the potential difference of the surface of the ground becomes about 0.1 V to 1 V.

Differential amplifying means 5 is a broadband preamplifier intended for performing impedance conversion to measure a potential difference between voltage signals generated on the ground by a current supplied by the amplifying means 4 to the ground by means of signals supplied from voltage measurement electrodes placed at two different positions, and supplies a signal to multiplying means 7. Subtracting means 6 is a broadband differential amplifier of the gain 1 constituted by a high-speed OP amplifier for calculating a subtracted value between the output signals supplied from the oscillating means 1 and the oscillating means 2, and supplies a signal for synchronous detection to the multiplying means 7. The multiplying means 7 for performing synchronous detection by means of signals supplied from the differential amplifying means 5 and the subtracting means 6 calculates the change width of a potential difference between voltage signals appearing between two points on the ground when alternating currents having two selected frequencies are each independently applied to the ground. The multiplying means 7 is connected to the low pass filtering means 8 to suppress a signal component for synchronous detection. With the above constitution, even when the change width of a potential difference between voltage signals appearing between two points on the ground when alternating currents having two selected frequencies are each independently applied to the ground is so small that it is lost in a quantization error involved in AD conversion, only the change width of the potential difference can be directly obtained as an output of a synchronous detector composed of a pair of the multiplying means 7 and the low pass filtering means 8 subsequent to the multiplying means 7. As a result, the change width of the potential difference can be directly subjected to AD conversion to be measured without being lost in the quantization error.

Second Embodiment

Figure 10A:
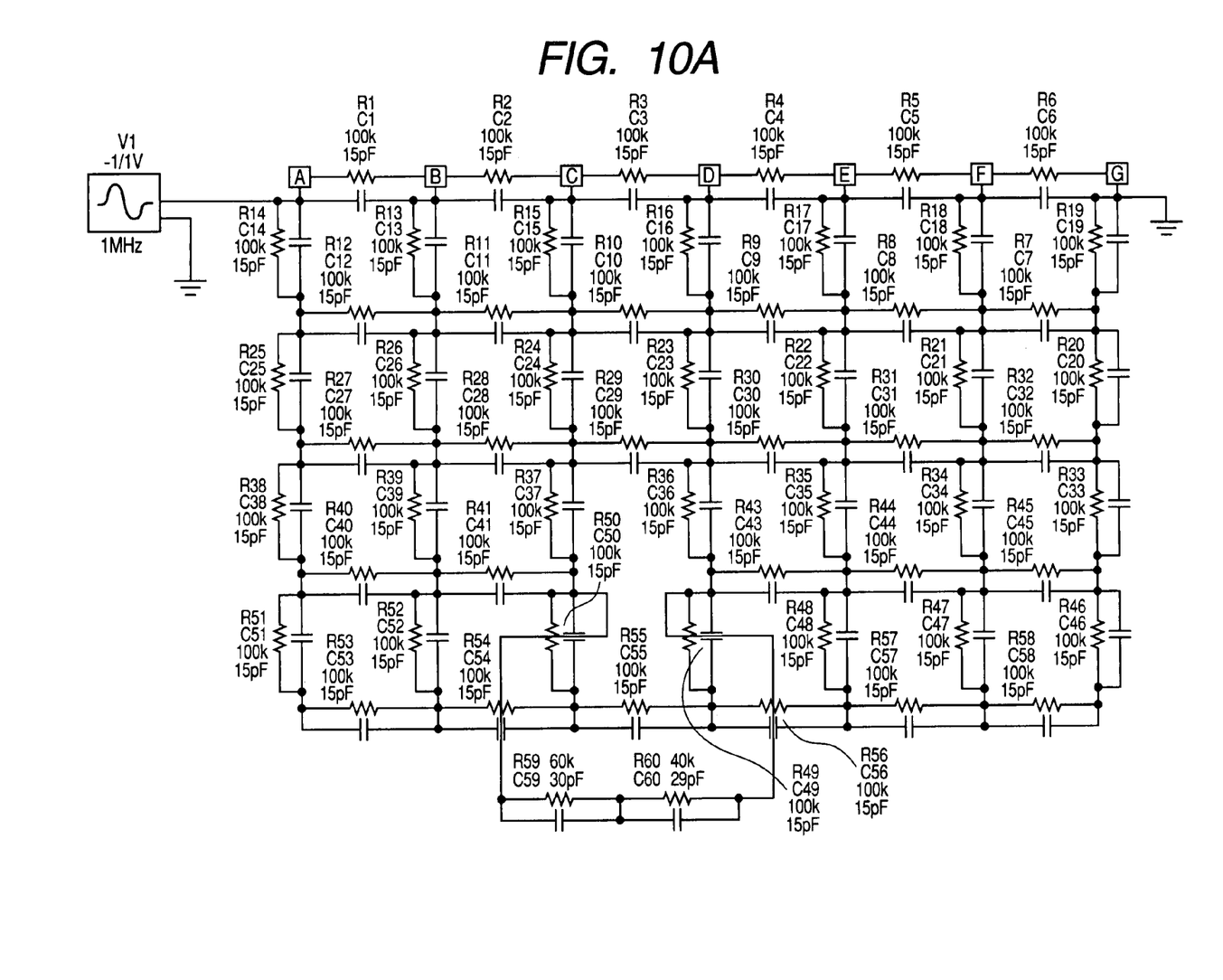
FIGS. 10A and 10B are each a view for explaining the amount of change in ground surface potential when a driving frequency is changed in a conventional alternating current test method.
Figure 10B:
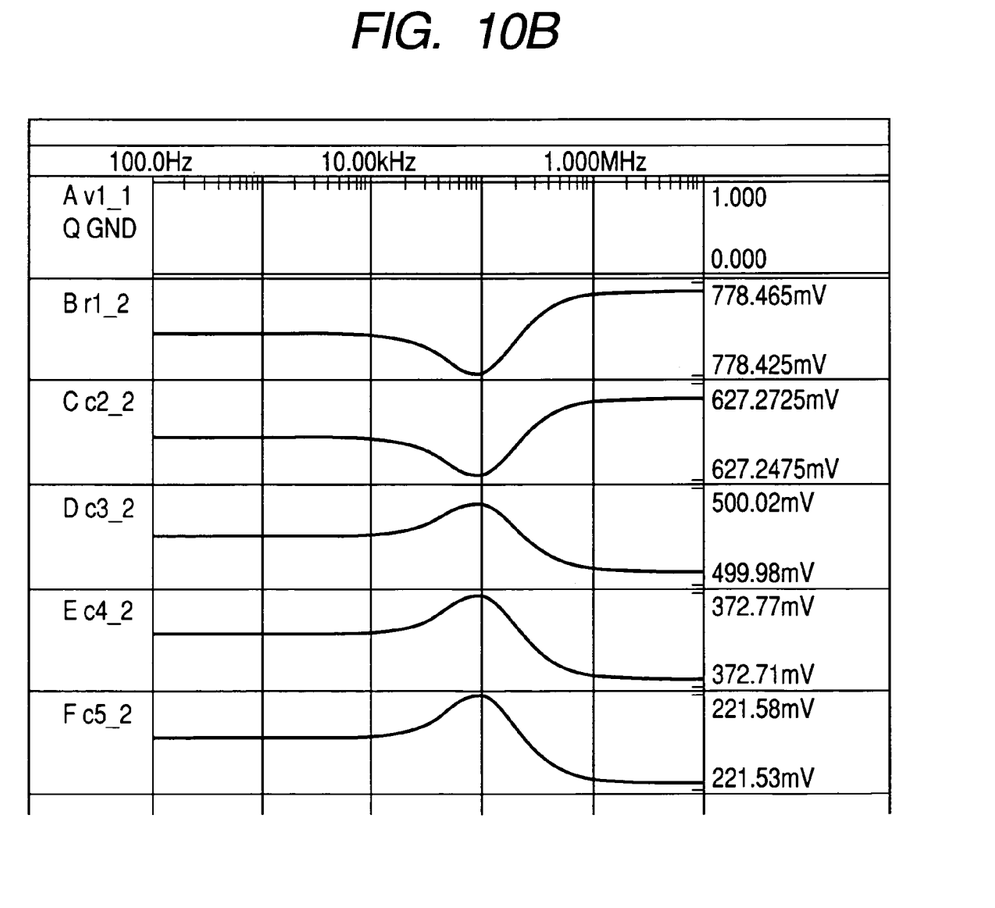

FIG. 10A shows the equivalent circuit of the ground. An upper portion in the figure refers to the surface of the ground and a lower portion in the figure refers to a deep part. Only one site having a slightly different impedance is present in a lower deep part between C and D of the surface of the ground. As shown in FIG. 10B, a point of inflection appears at a frequency of 100 kHz when a conventional alternating current test is performed in a frequency band ranging from 100 Hz to 10 MHz. However, a potential difference at the surface of the ground is at most about 40 μV even in the case where the first frequency is set to 100 kHz and the second frequency is set to 1 MHz (the extreme case). In consideration of the fact that a ground surface potential amplitude is 778.465 mV, it can be understood that it is very difficult to accurately measure a change on the fifth digit even when high-accuracy AD conversion is performed by means of, for example, a delta sigma-type AD converter.

Figure 11A:
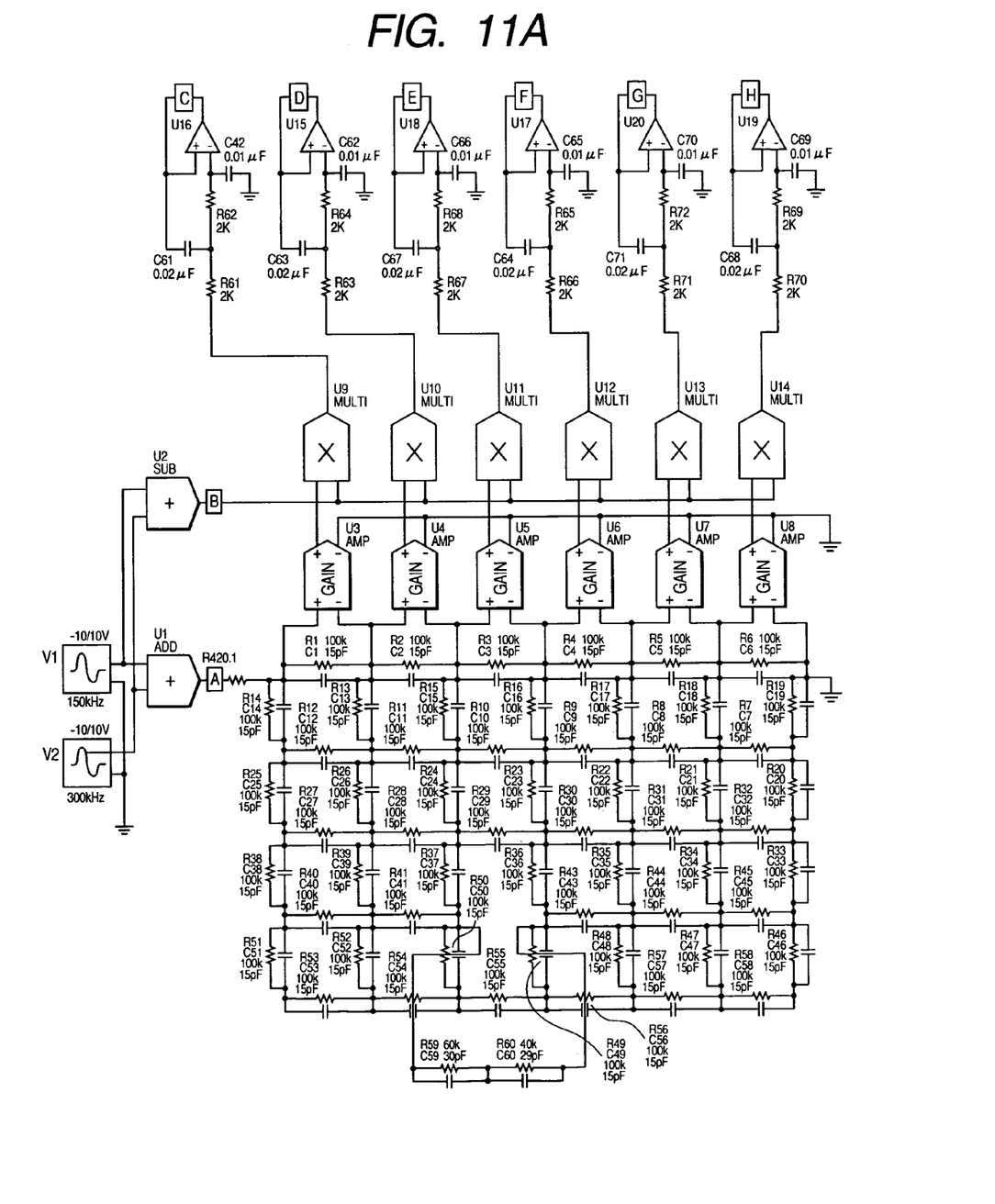
FIGS. 11A and 11B are views for explaining the structure and function of the ground probing system according to the embodiment of the present invention.
Figure 11B:
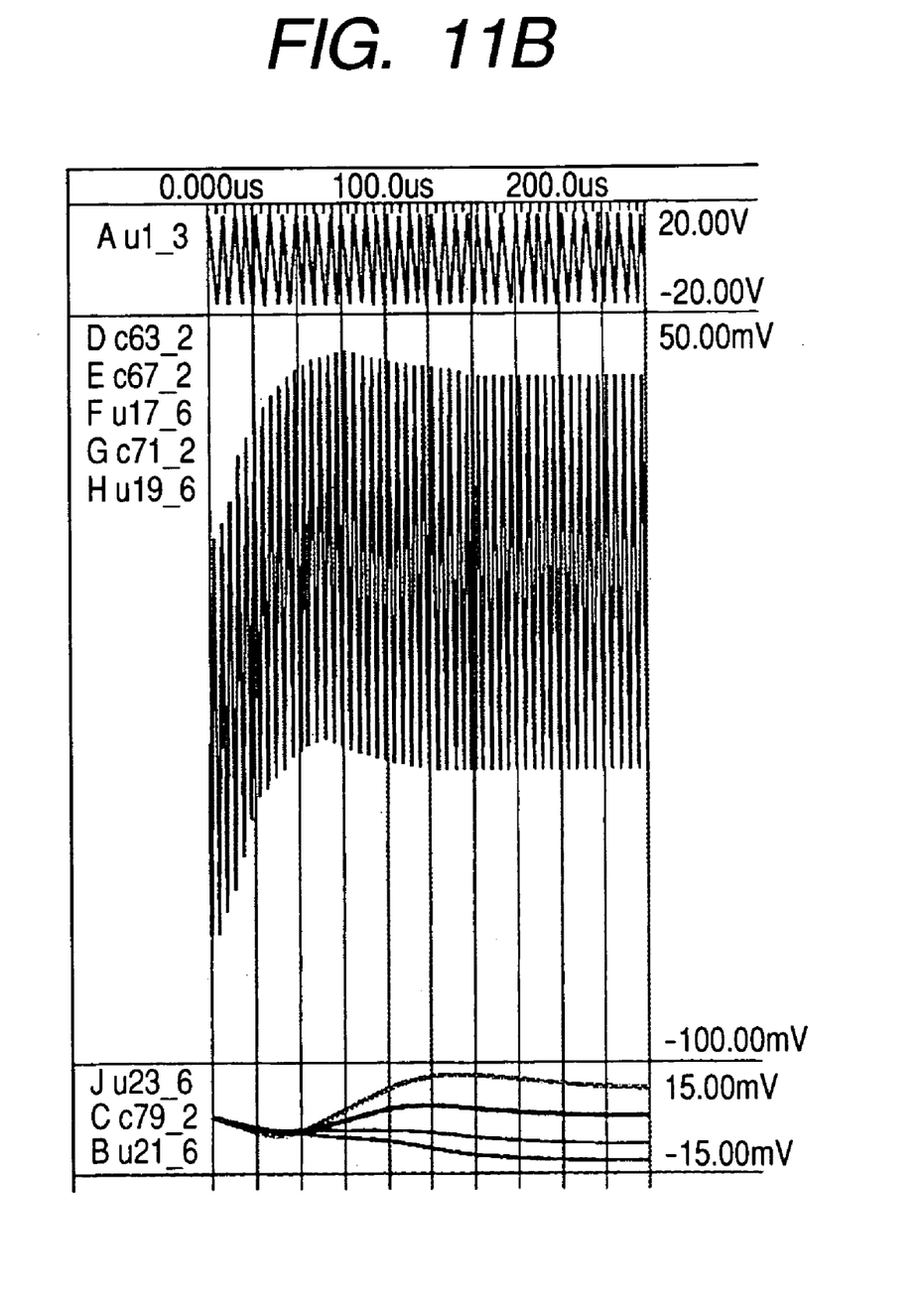

FIGS. 11A and 11B are views for explaining the structure and effect according to another embodiment of the present invention. FIG. 11A shows a circuit in the case where the present invention is applied to the same equivalent circuit of the ground as that shown in FIG. 10A. The low pass filtering means 8 is realized by two stages of low pass filters. As is apparent from FIG. 11B, a high-frequency component of a signal for synchronous detection supplied from the subtracting means 6 is sufficiently suppressed by the low pass filtering means 8. As a result, in spite of the fact that this case is the case where the change width of a potential difference between voltage signals appearing between two points on the ground when alternating currents having two selected frequencies are each independently applied to the ground is so small that it is lost in a quantization error involved in AD conversion, only the change width of the potential difference can be directly obtained as an output of a synchronous detector composed of a pair of the multiplying means 7 and the low pass filtering means 8 subsequent to the multiplying means 7.

Third Embodiment

Figure 12:
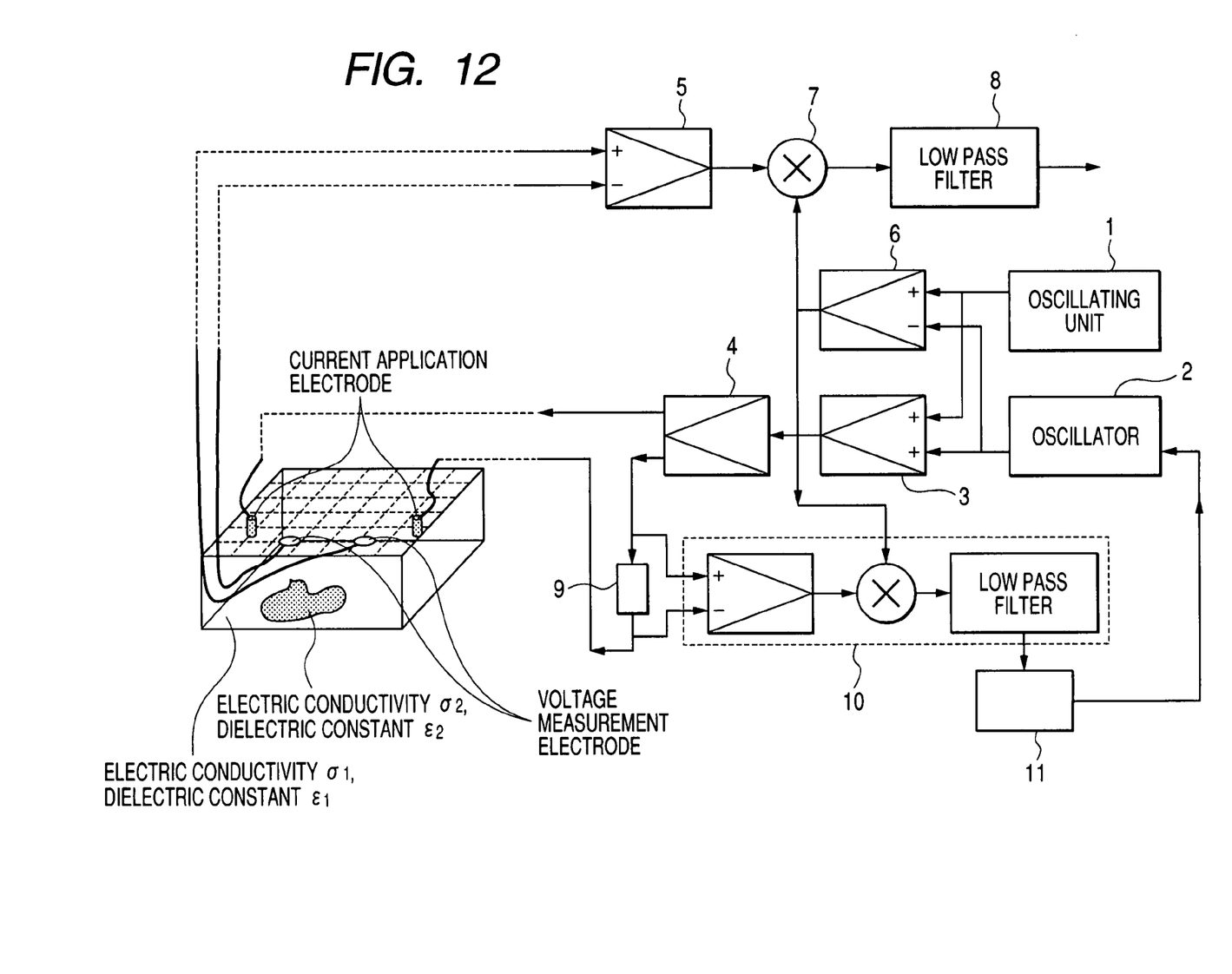
FIG. 12 is a view for explaining the structure of the ground probing system according to the embodiment of the present invention.

FIG. 12 is a view for explaining the structure according to another embodiment of the present invention. FIGS. 11A and 11B each show a structure obtained by adding, to the embodiment shown in FIG. 1, synchronous detecting means 10 and constant current controlling means 11 as elements for performing constant current driving control. The synchronous detecting means 10 is intended for performing synchronous detection by means of output signals supplied from the instantaneous current measuring means 9 and the subtracting means 6 to sample a difference between the current amplitude of a first frequency component and the current amplitude of a second frequency component. The constant current controlling means 11 is intended for supplying a control signal for causing at least one of the oscillating means 1 and the oscillating means 2 to adjust the amplitude of an output voltage by means of a signal supplied from the synchronous detecting means 10 in such a manner that the difference between the current amplitude of the first frequency component and the current amplitude of the second frequency component is cancelled. A precision metal film resistor of 50 mΩ suitable for current measurement is used for the instantaneous current measuring means 9. The synchronous detecting means 10 is a synchronous detector circuit composed of the differential amplifying means 5, the multiplying means 7, the low pass filtering means 8, and an element having circuit performance equivalent to each of them. The synchronous detecting means 10 is a functional block for determining the difference between the current amplitude of the first frequency component and the current amplitude of the second frequency component. In addition, the synchronous detecting means supplies a signal to the oscillating means 2 in such a manner that an input becomes 0, to thereby adjust only the amplitude of an output voltage to the adding means 3. In this case, control is performed to cause the current amplitude of the first frequency component and the current amplitude of the second frequency component to coincide with each other at all times even when a driving frequency is changed or conditions under which a current is applied to the ground are changed.

The disclosed embodiments are merely for explanation in all respects, and should not be construed as being restrictive. The scope of the present invention is shown not by the above description but by the scope of claims. It is intended that the meaning equivalent to the scope of claims and all modifications within the scope are incorporated herein.

According to the present invention, a non-invasive probing method involving applying a current from the surface of a ground to measure a surface potential enables the presence of a region contaminated with a low concentration of a specific contaminant that may be present in the ground to be selectively probed. As a result, the contaminant can be specified, and the contamination position and depth of the contaminant can be determined. That is, non-invasive excavation survey requiring a long time period is not needed, so survey can be performed for a short time period and at a low cost.

Furthermore, in the case of an excavation survey method, only an excavated part can be surveyed. Therefore, an unexcavated part may be contaminated even when the excavated part is not contaminated. That is, there remains a possibility that a region between excavated parts or a region deeper than an excavation depth is contaminated, so a contamination source cannot be searched in some cases. In contrast, according to the present invention, the failure to search for the contamination source hardly occurs.

The present invention can be used for the specification of substances in a contamination source such as a volatile organic solvent (VOC), a heavy metal, and fat and oil, and for the specification of the position and depth of a region contaminated with the substances. In addition, the present invention can be used for various fields including the detection of water leaking from a tap water conduit, the search for an underground structure, and the search for a personnel mine.

This application claims priority from Japanese Patent Application No. 2004-317845 filed on Nov. 1, 2004, which is hereby incorporated by reference herein.

What is claimed is:

1. An underground exploration apparatus comprising:
   a first oscillating means for generating an alternating voltage signal of a first frequency out of two different frequencies selected on the basis of frequency characteristics of a dielectric constant of a substance to be probed;
   a second oscillating means for generating an alternating voltage signal of a second frequency out of the two frequencies;
   adding means for calculating an added value of output signals supplied from the first oscillating means and the second oscillating means;
   amplifying means for amplifying an added alternating current signal supplied from the adding means to supply signals to two current application electrodes each intended for applying a current between two different points on a ground;
   differential amplifying means for measuring a potential difference between voltage signals generated on the ground by a current supplied by the amplifying means to the ground by means of signals supplied from voltage measurement electrodes placed at two different positions;
   subtracting means for calculating a subtracted value between the output signals supplied from the first oscillating means and the second oscillating means;
   multiplying means for performing synchronous detection by means of signals supplied from the differential amplifying means and the subtracting means; and
   low pass filtering means for removing a high-frequency component from a signal supplied from the multiplying means.

2. The underground exploration apparatus according to claim 1, further comprising instantaneous current measuring means for measuring the current supplied by the amplifying means to the ground.

3. The underground exploration apparatus according to claim 2, further comprising:
   synchronous detecting means for performing synchronous detection by means of output signals supplied from the instantaneous current measuring means and the subtracting means to sample a difference between a current amplitude of a first frequency component and a current amplitude of a second frequency component; and
   constant current controlling means for supplying a control signal for causing at least one oscillating means to adjust an amplitude of an output voltage by means of a signal supplied from the synchronous detecting means in such a manner that the difference between the current amplitude of the first frequency component and the current amplitude of the second frequency component is cancelled.

* * * * *